US010934904B2

(12) United States Patent
Banks, III

(10) Patent No.: US 10,934,904 B2
(45) Date of Patent: Mar. 2, 2021

(54) LUBE OIL AERATION AND THERMAL CONTROL SYSTEM

(71) Applicant: Gale C. Banks, III, Bradbury, CA (US)

(72) Inventor: Gale C. Banks, III, Bradbury, CA (US)

( * ) Notice: Subject to any disclaimer, the term of this patent is extended or adjusted under 35 U.S.C. 154(b) by 0 days.

(21) Appl. No.: 16/920,644

(22) Filed: Jul. 3, 2020

(65) Prior Publication Data

US 2021/0003050 A1 Jan. 7, 2021

Related U.S. Application Data

(60) Provisional application No. 62/870,670, filed on Jul. 3, 2019.

(51) Int. Cl.

| | |
|---|---|
| ***F01M 11/03*** | (2006.01) |
| ***F01M 11/00*** | (2006.01) |
| ***F01M 5/00*** | (2006.01) |
| ***B01D 45/08*** | (2006.01) |
| ***F01M 1/02*** | (2006.01) |

(52) U.S. Cl.

CPC ......... *F01M 11/0004* (2013.01); *B01D 45/08* (2013.01); *F01M 1/02* (2013.01); *F01M 5/002* (2013.01); *F01M 11/03* (2013.01); *F01M 2011/0033* (2013.01); *F01M 2011/031* (2013.01)

(58) Field of Classification Search

CPC .................. F01M 2011/005; F01M 2011/0033

USPC ...................................................... 123/196 A

See application file for complete search history.

(56) References Cited

U.S. PATENT DOCUMENTS 3,106,263 A * 10/1963 McKellar ............... F01M 11/06 184/106
4,270,497 A * 6/1981 Valerio ............. F01M 11/0004 123/195 C
4,519,348 A * 5/1985 Hamilton ........... F01M 11/0004 123/195 C
5,809,963 A * 9/1998 Saito ................. F01M 11/0004 123/195 C (Continued)

*Primary Examiner* — Long T Tran
*Assistant Examiner* — James J Kim
(74) *Attorney, Agent, or Firm* — Richard Batt

(57) ABSTRACT

A system for collecting lube oil in an internal combustion engine with a rotating crankshaft assembly reduces lube oil aeration. The system includes a primary separation chamber arranged above an oil sump; an air interchange zone arranged above the primary separation chamber; an entrance aperture fluidly coupling the air interchange zone to the primary separation chamber; an exit aperture laterally spaced from the entrance aperture and fluidly coupling the primary separation chamber to the air interchange zone and for guiding air arising from the motion of the rotating crankshaft assembly from the primary separation chamber to the air interchange zone; and a main oil accumulation plate extending from the entrance aperture to the exit aperture and separating the primary separation chamber and the air interchange zone. The system further features a primary oil accumulation plate located above the exit aperture, extending towards the main oil accumulation plate at a first angle, and defining an airflow control aperture between the main oil accumulation plate and the primary oil accumulation plate through which fluids from the exit aperture are directed.

22 Claims, 17 Drawing Sheets

(56) References Cited

U.S. PATENT DOCUMENTS

| | | | | |
|---|---|---|---|---|
| 7,341,039 | B1 * | 3/2008 | Jaszewski | F01M 11/0004 123/195 AC |
| 10,385,742 | B2 * | 8/2019 | Dunn | F01M 13/0011 |
| 2010/0132655 | A1 * | 6/2010 | Wunsch | F01M 13/04 123/196 R |
| 2012/0067319 | A1 * | 3/2012 | Cygan, Jr. | F01M 11/0004 123/196 A |

* cited by examiner

| APERTURE | WIDTH | WIDTH COMPARISON | MATERIAL FLOWED |
|---|---|---|---|
| Entrance | 1.144" | 100% | Oil & Air |
| Exit | 0.752" | 34.3% smaller | Oil Mist & Air |
| Airflow Control | 0.430" | 62.4% smaller | Air Only |

| APERTURE | AREA | FLOW AREA COMPARISON | MATERIAL FLOWED |
|---|---|---|---|
| Entrance | 15.47 $in^2$ | 100% | Oil & Air |
| Exit | 11.69 $in^2$ | 24.4% less | Oil Mist & Air |
| Airflow Control | 8.40 $in^2$ | 45.7% less | Air Only |

FIG. 12

| | Stock | Banks Test 1 | Banks Test 2 |
|---|---|---|---|
| Full Power | 340 hp @ 3150 rpm | 344 hp @ 3150 rpm | 344 hp @ 3150 rpm |
| Oil in Sump (Engine Off) | 9.75 qts | 11.00 qts | 11.00 qts |
| Oil in Sump (@ Full Power) | 4.75 qts | 8.00 qts | 8.00 qts |
| Oil in Crank Case (@ Full Power) | 5.00 qts | 3.00 qts | 3.00 qts |
| In Sump Oil Aeration | 8.9% | 3.3% | 3.4% |
| Oil Cooler Coolant Temperature | 198.9° F | 206.6° F | 199.5° F |
| Oil Temp | 264.9° F | 266.0° F | 259.1° F |
| Coolant Temperature Comparison | – | +7.7° F | +0.6° F |
| Oil Temperature Comparison | – | +1.1° F | -5.8° F |
| Comments | – | Coolant temp not equal to stock baseline. Test Not Valid. | Coolant temp compares to stock baseline. Test Valid. |
| Reduction in Oil Temperature with Matching Coolant Temperature | – | N/A | -2.2% |
| Power Gain | – | 4 hp or 1.2% | 4 hp or 1.2% |
| %Reduction Oil in Crankcase | – | 40% | 40% |
| %Reduction Oil in Oil Aeration | – | 62.9% | 61.8% |

FIG. 13

LUBE OIL AERATION AND THERMAL CONTROL SYSTEM

CROSS-REFERENCE TO RELATED APPLICATIONS

This claims priority to provisional application No. 62/870,670, filed Jul. 3, 2019, the entirety of which is incorporated by reference for all purposes.

BACKGROUND

Engines have reciprocating and/or rotating mechanisms that require lubrication to the crankshaft, camshaft bearings and other load bearing, rolling, sliding or rotating load points. Also, many of the components such as pistons require lube oil cooling. The lube oil is pumped from a sump into a system of passages to the frictional interfaces or to cooling nozzles that spray components in need of cooling. Once lube oil exits the frictional interfaces or component cooling interfaces, its job is done.

However, and with reference to FIG. 1, various problems arise in the above described systems because the lube oil 10 is entrained in the engine system 12 and is being centrifuged by the rotating components and pulsed/propelled by the reciprocating components. An example of this phenomena is the high velocity oil/air cyclonic cloud 20 illustrated in FIG. 1.

The above mentioned problem has been addressed by various technologies to limited degree. For example, and with reference to FIGS. 2-3 crankshaft scraper systems 50 comprising scraper 60, impact surface, or similar device have been utilized to impact and deflect oil 70 from the rotating and reciprocating components into the oil sump 80. In the process a tremendous amount of work is done to the oil to impact and deflect it into the oil sump, heating and aerating the oil in the process. Further, aerodynamic drag is created by the scraper system or, impact surfaces, loading the rotating group parasitically as high aerodynamic drag is created at the scraper interface, or impact surfaces, increasing parasitic losses and diminishing the engine's power output. This is undesirable.

Accordingly, a new and improved system that overcomes the above mentioned shortcomings is desired.

SUMMARY OF THE INVENTION

New and improved systems are described herein to control lube oil aeration and oil temperature in an engine where embodiments of the invention provide one or more of the following advantages over prior designs: lower oil temperature; lower oil aeration percentage; greater oil film strength; increase flywheel horse power by cutting parasitic horsepower draw due to windage impact losses; better bay to bay breathing; better oil drain back from cylinder heads; a reduction of the oil in residence in the cylinder heads and crankcase resulting in lower parasitic power loss, lower aeration created and lower oil temperature; more oil in the sump at full power keeping oil at the pickup under high dynamic conditions both laterally and vertically; better fuel economy; and better lubrication during vehicle pitch, yaw and roll conditions and high G-force accelerations, deceleration and cornering loads due to the additional oil available in the sump.

BRIEF DESCRIPTION OF FIGURES

The above-mentioned aspects, as well as other features, aspects and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise where.

Figure 5:
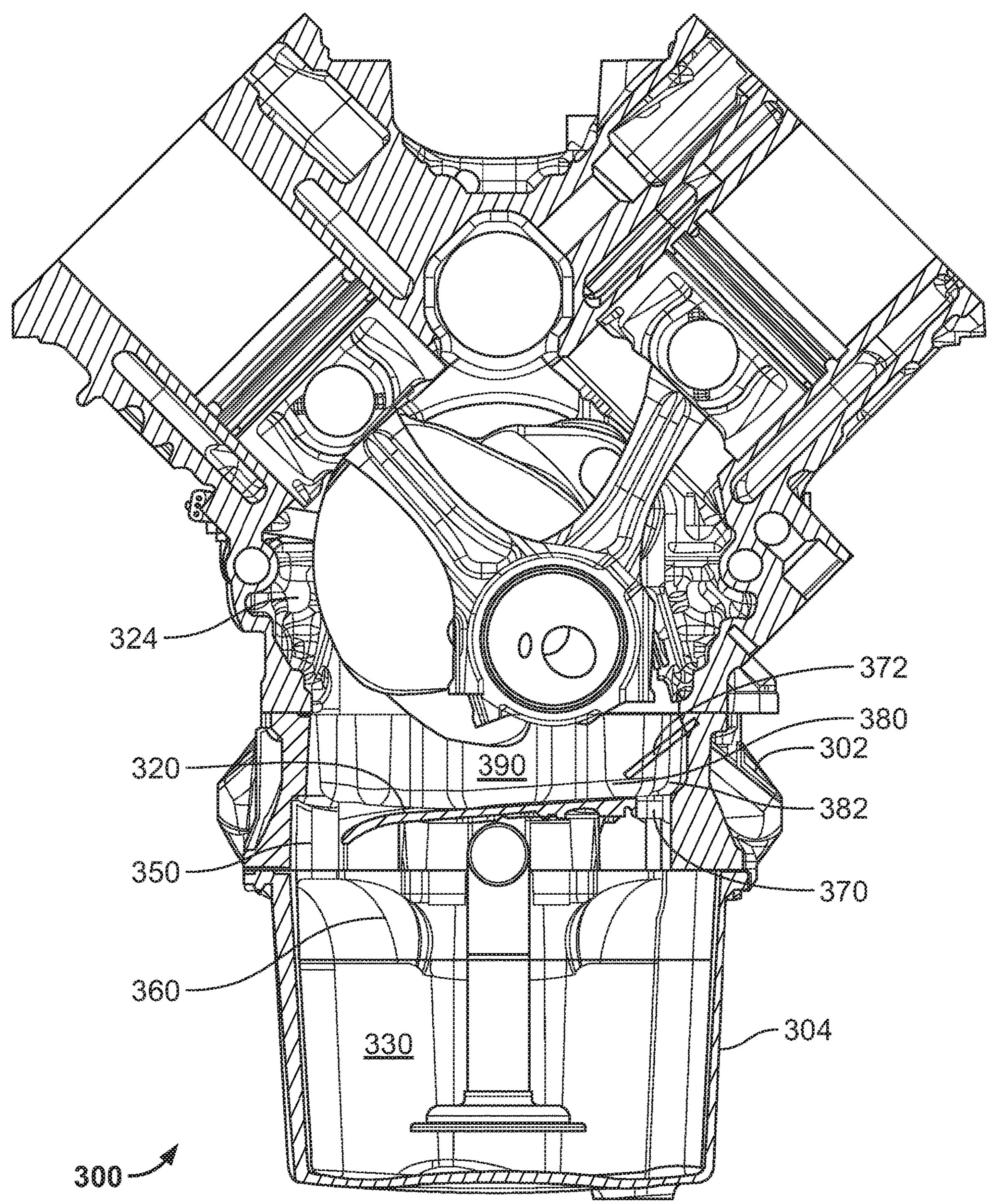
Figure 6:
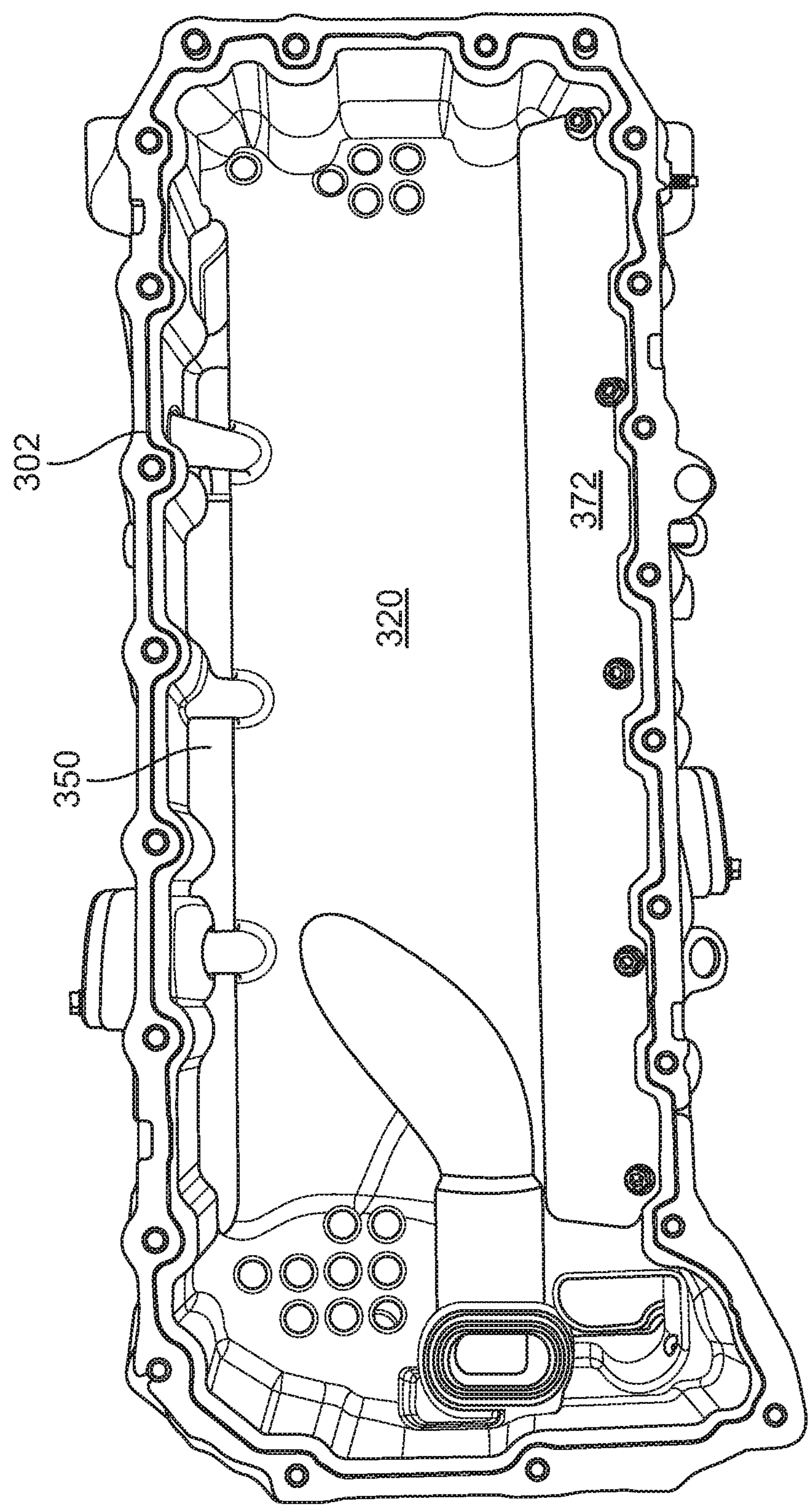
Figure 7:
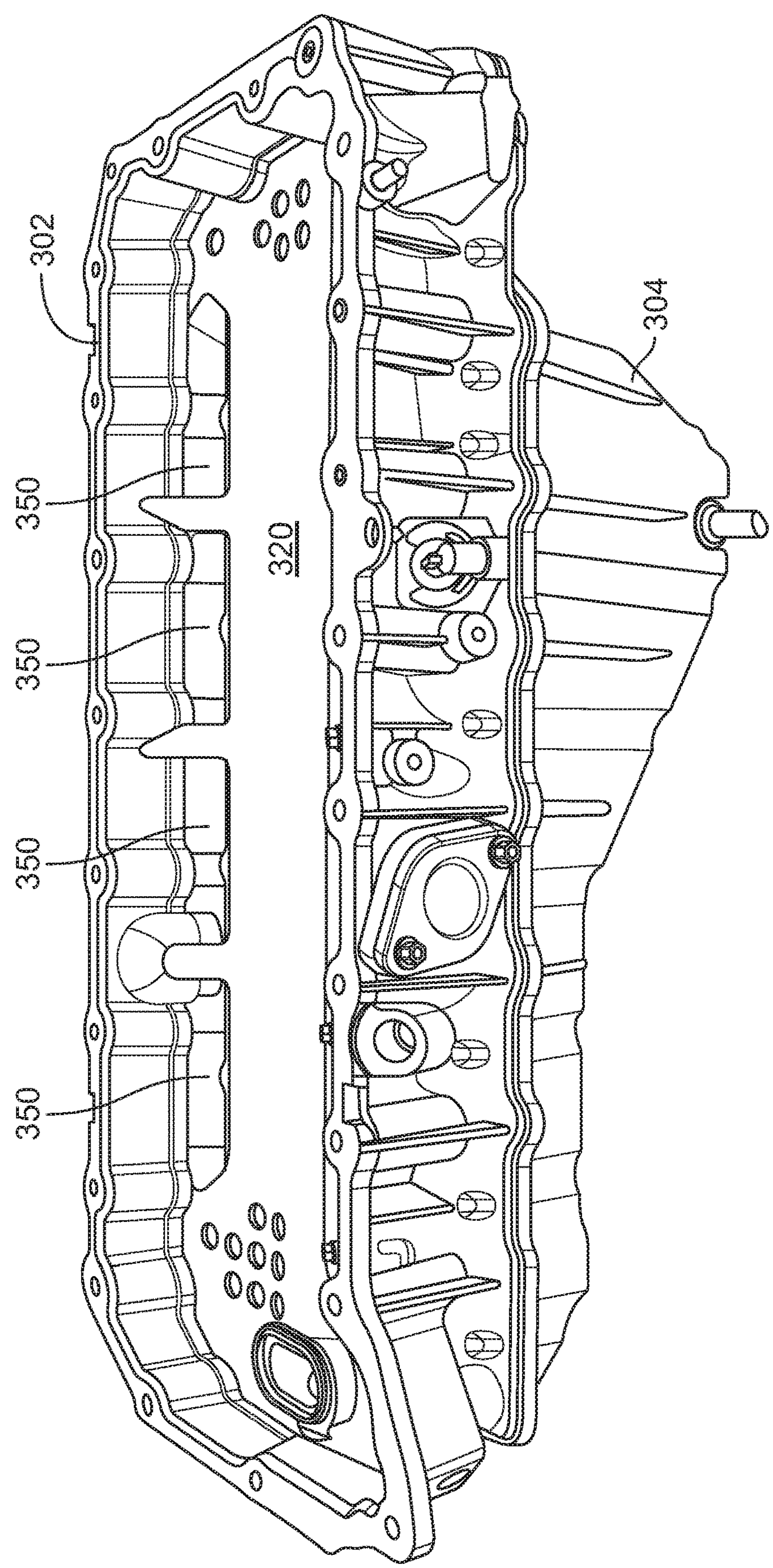
Figure 8:
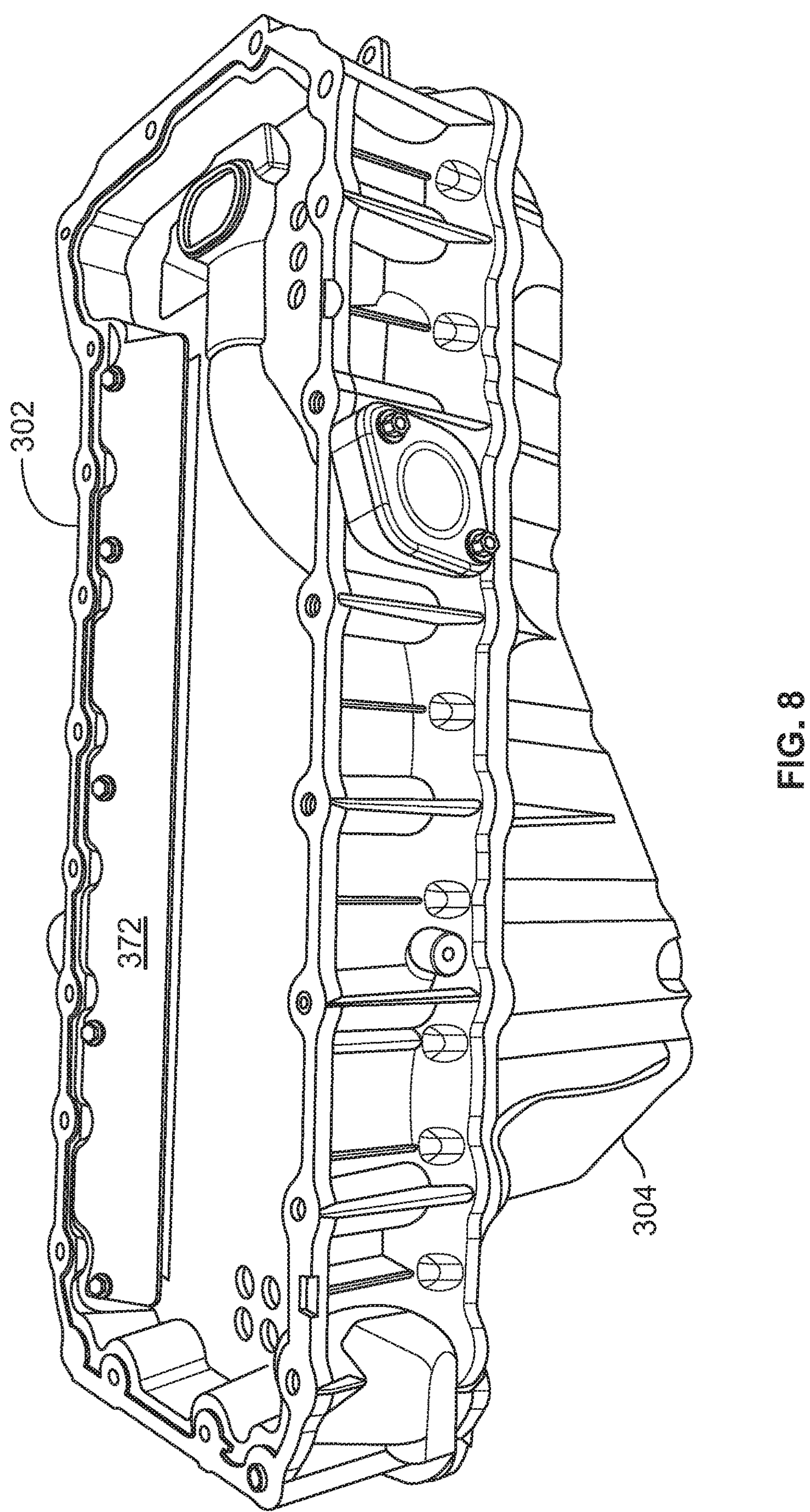
Figure 9:
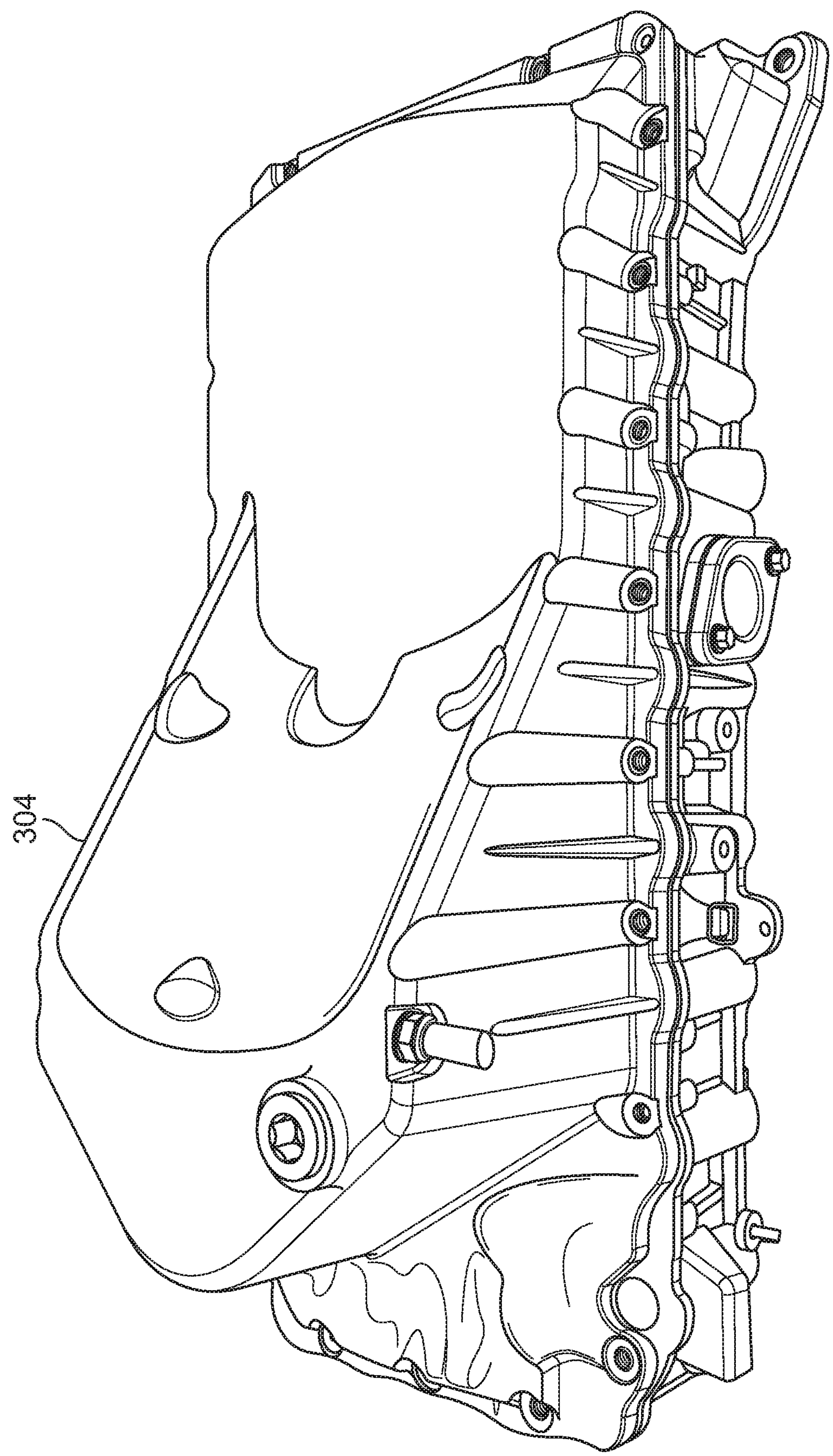
Figure 10:
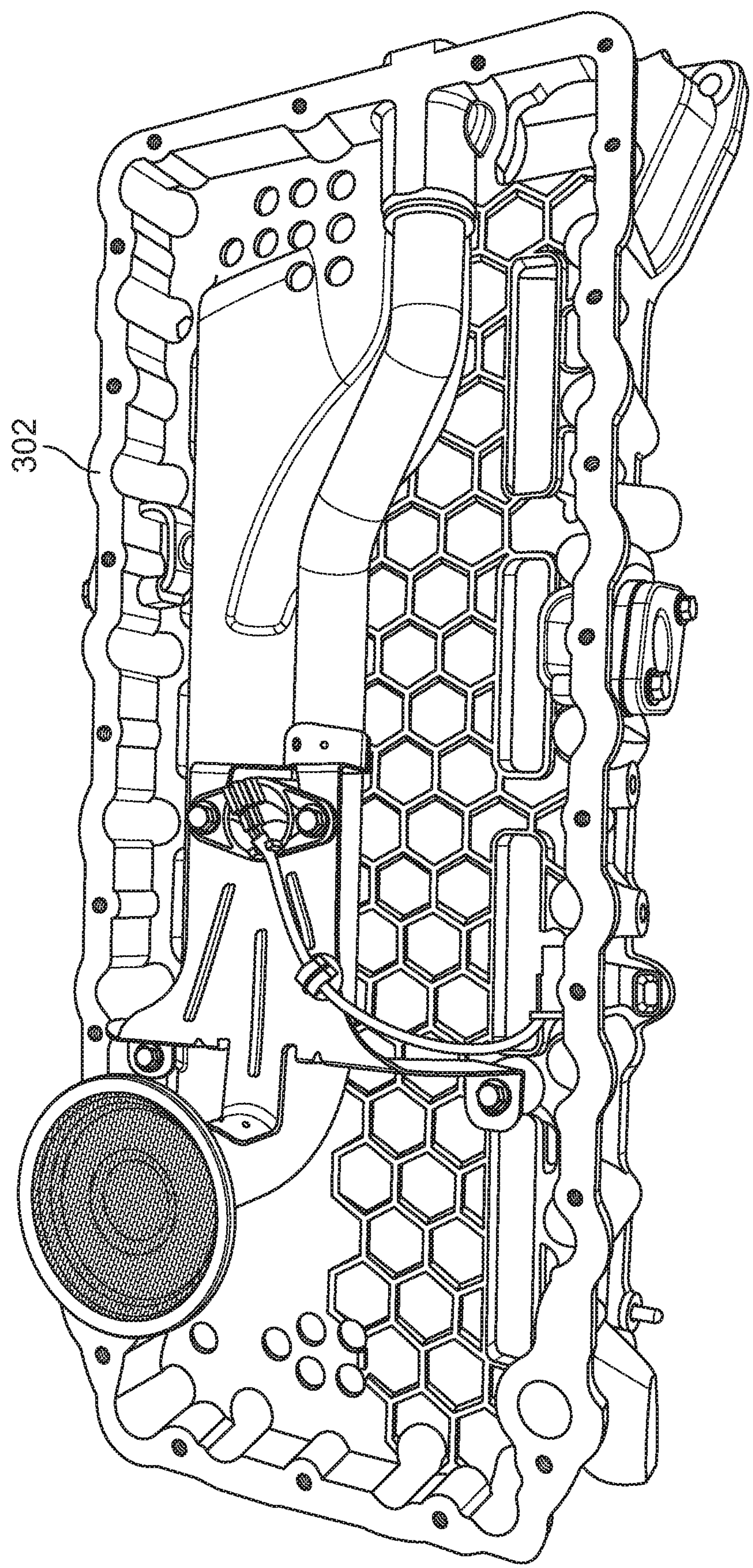
Figure 11:
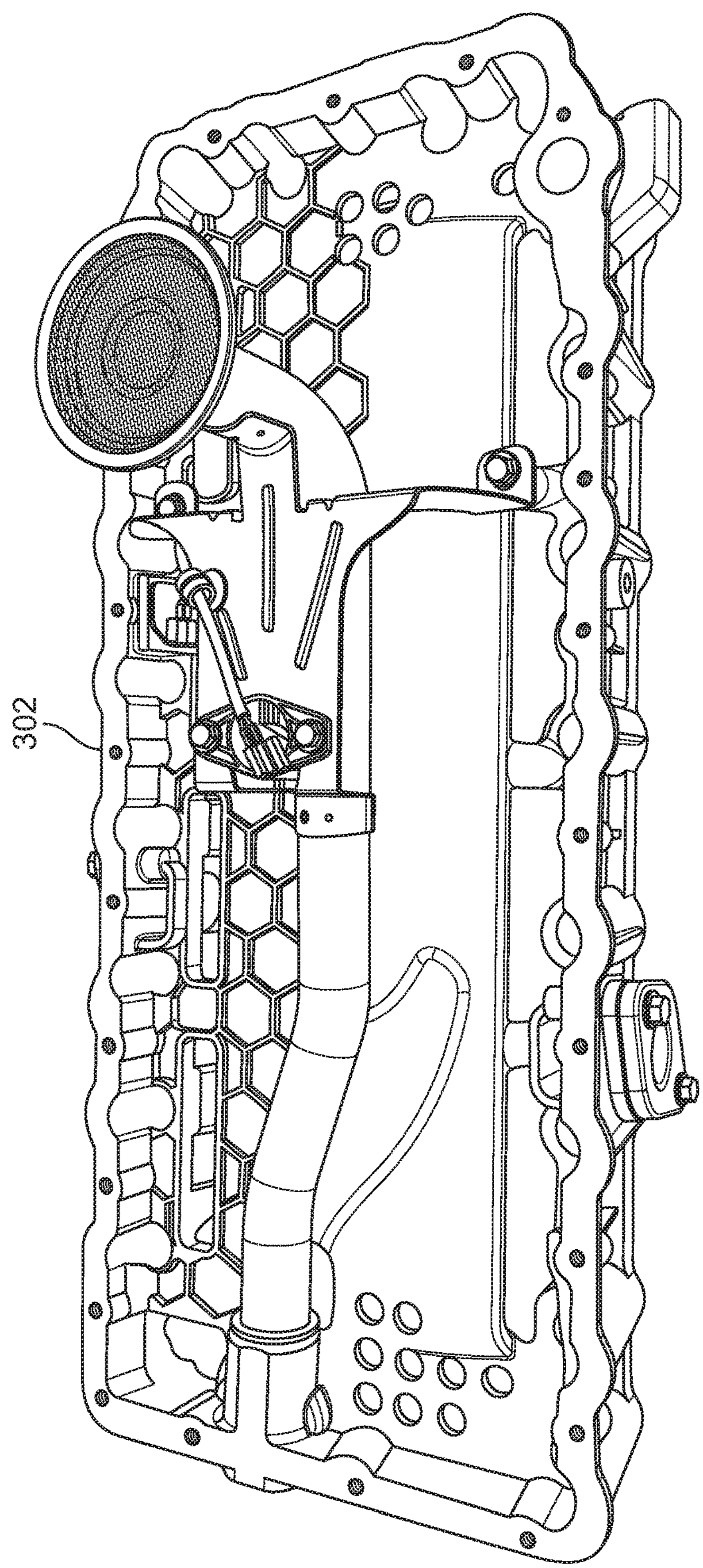

FIG. **4*a*** is a cross section view of a system in accordance with a preferred embodiment of the invention;

FIG. **4*b*** is an airflow diagram in accordance with a preferred embodiment of the invention;

FIG. **4*c*** is an oilflow diagram in accordance with a preferred embodiment of the invention;

FIG. **4*d*** is a cross section view of a system in accordance with another embodiment of the invention;

FIG. **4*e*** is a cross section view of a system in accordance with another embodiment of the invention;

FIG. 5 is a cross section of a two-piece system including an upper oil pan and a lower oil pan in accordance with another embodiment of the invention;

FIG. 6 is a top view of the upper oil pan shown in FIG. 5 in accordance with an embodiment of the invention;

FIG. 7 is an upper left side perspective view of the upper and lower oil pan assembly (left side as installed in vehicle) shown in FIG. 5 in accordance with an embodiment of the invention;

FIG. 8 is an upper right side perspective view of the upper and lower oil pan assembly (right side as installed in vehicle) in accordance with an embodiment of the invention;

FIG. 9 is a bottom view of the upper and lower oil pan assembly shown in FIG. 5 in accordance with an embodiment of the invention;

FIG. 10 is a bottom view of the upper oil pan of FIG. 5 with the lower oil pan/sump removed in accordance with an embodiment of the invention;

FIG. 11 is another bottom view of the upper oil pan of FIG. 5, reversed, showing a plurality of exit apertures/nozzles in accordance with an embodiment of the invention;

FIG. 12 is a table indicating oil-air separator aperture size progression in accordance with an embodiment of the invention; and FIG. 13 is a table indicating test results of an embodiment of the invention versus a stock oil pan assembly.

DESCRIPTION OF THE INVENTION

It is to be understood that the embodiments of the invention described herein are not limited to particular variations set forth herein as various changes or modifications may be made to the embodiments of the invention described and equivalents may be substituted without departing from the spirit and scope of the embodiments of the invention. As will be apparent to those of skill in the art upon reading this disclosure, each of the individual embodiments described and illustrated herein has discrete components and features that may be readily separated from or combined with the features of any of the other several embodiments without departing from the scope or spirit of the embodiments of the present invention. In addition, many modifications may be made to adapt a particular situation, material, composition of matter, process, process act(s) or step(s) to the objective(s), spirit or scope of the embodiments of the present invention. All such modifications are intended to be within the scope of the invention.

Additionally, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It will also be understood that, although the terms first, second, etc. may be used herein to describe various elements, these elements should not be limited by these terms. These terms are only used to distinguish one element from another. Thus, a first element could be termed a second element without departing from the teachings of the present invention.

Some embodiments have been described in connection with the accompanying drawings. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

All existing subject matter mentioned herein (e.g., publications, patents, patent applications and hardware) is incorporated by reference herein in its entirety except insofar as the subject matter may conflict with that of the present invention (in which case what is present herein shall prevail).

Figure 1:
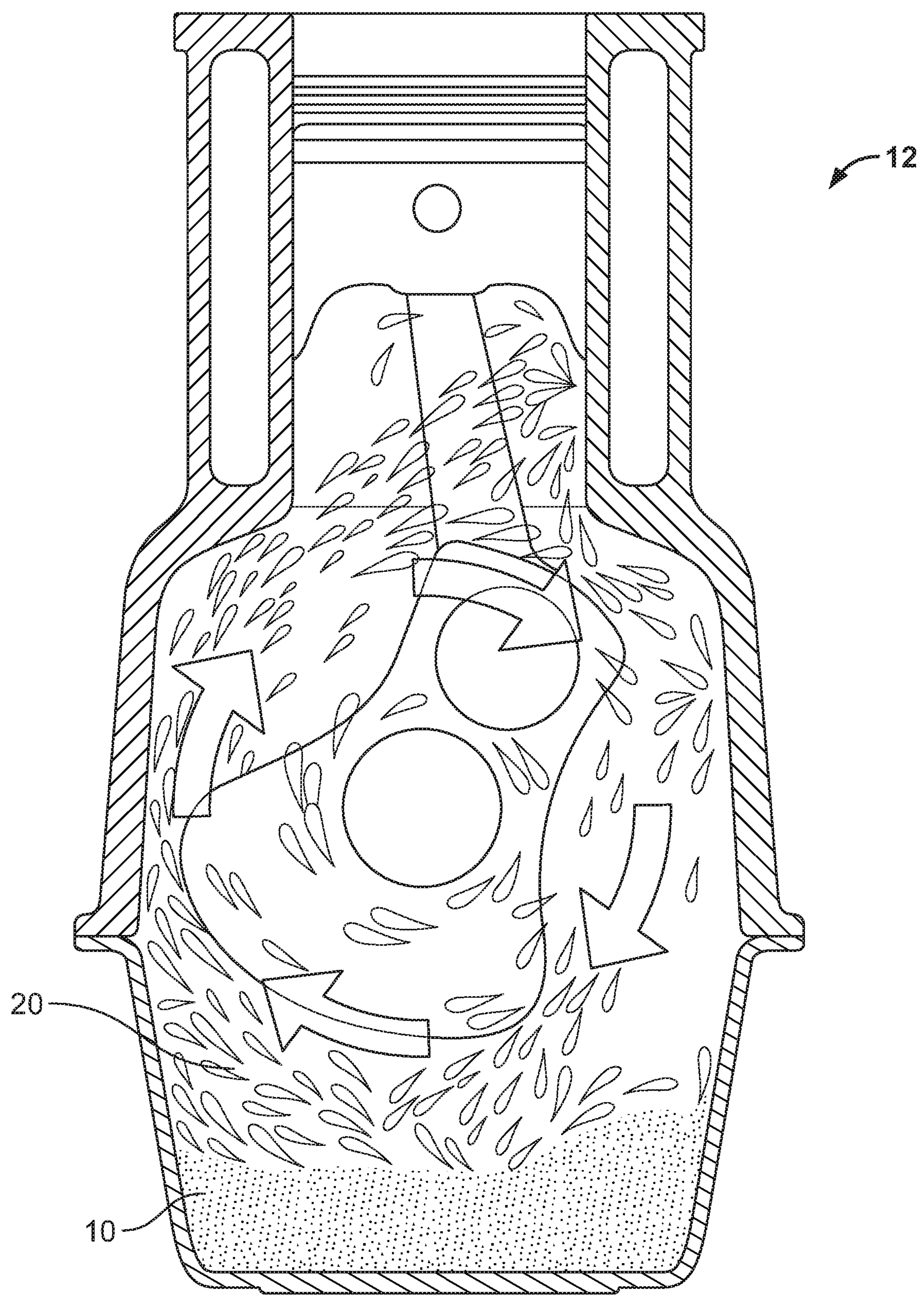
FIG. 1 is an engine cross section view illustrative of the prior art.
Figure 2:
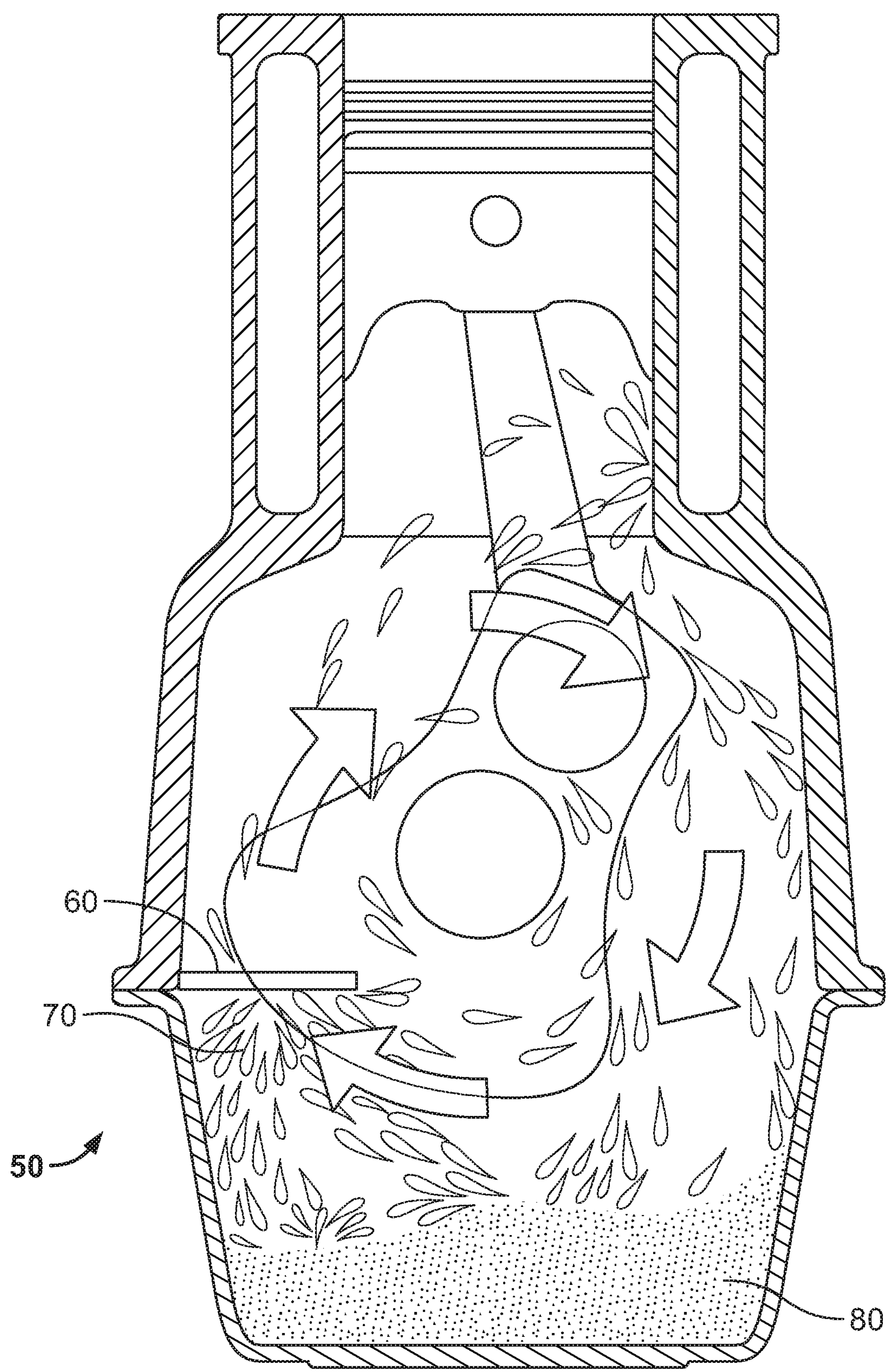
FIG. 2 is an engine cross section view with a crankshaft scraper illustrative of the prior art.
Figure 3:
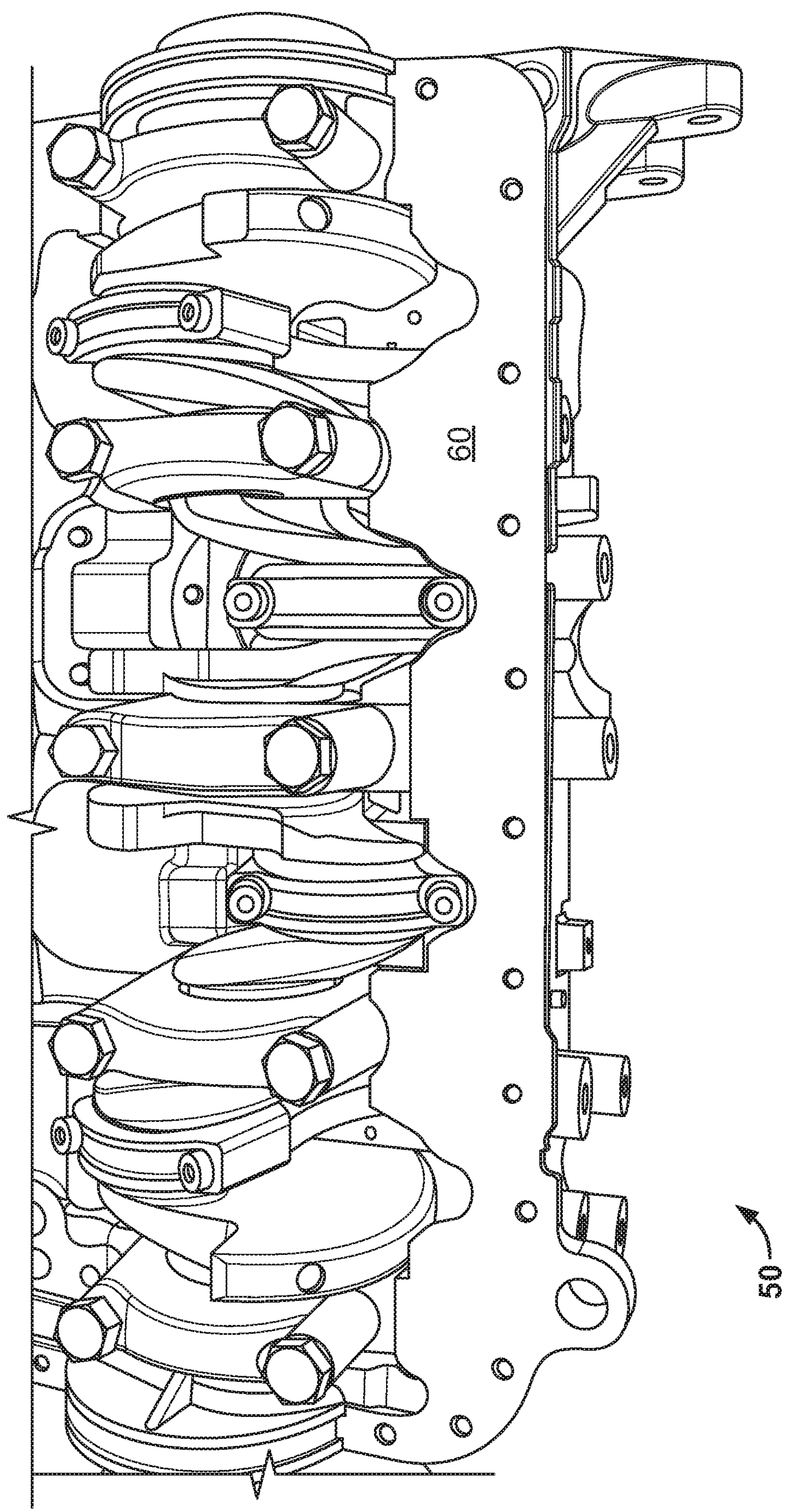
FIG. 3 is a perspective view of the prior art crankshaft scraper shown in FIG. 2.
Figure 4A:
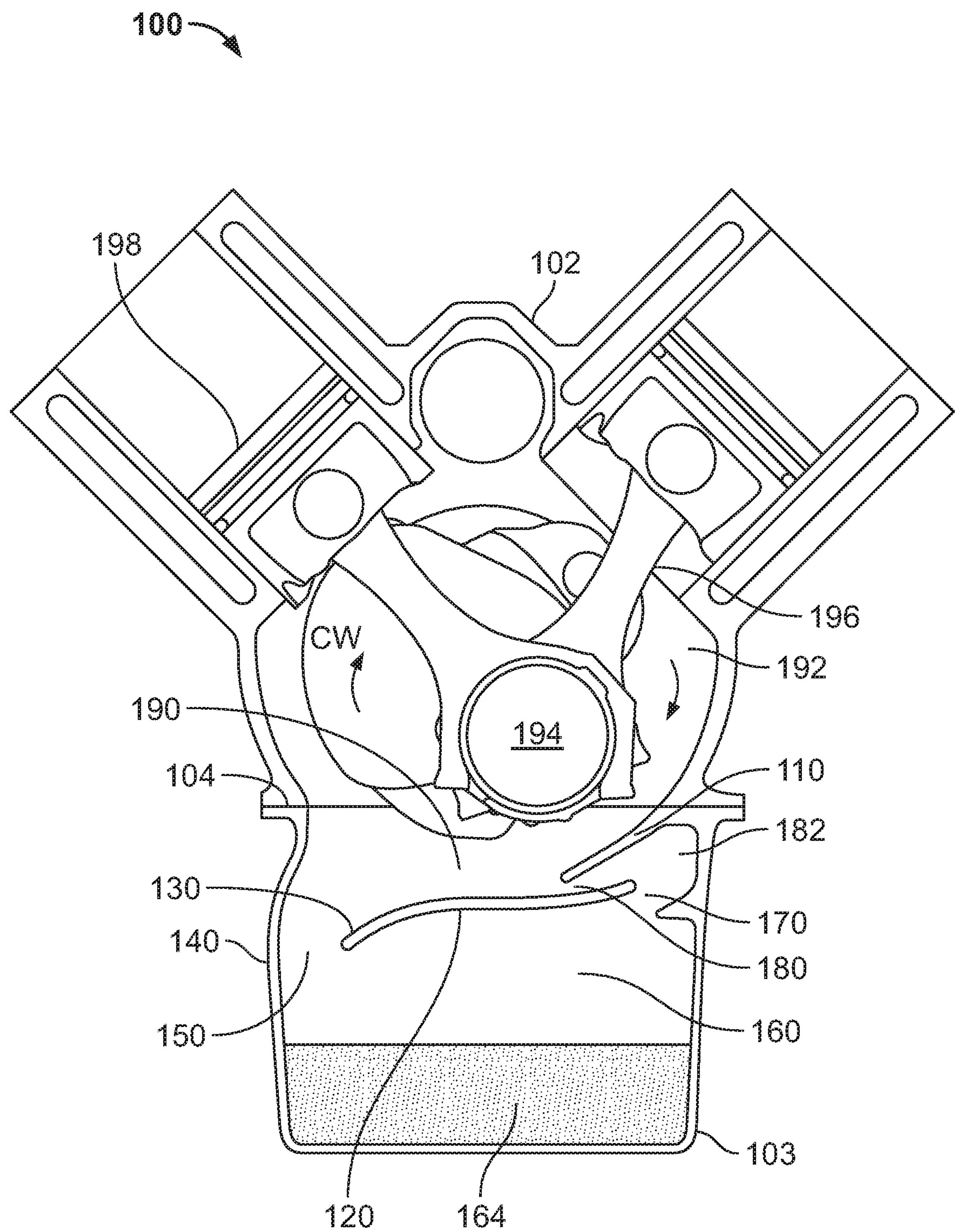

Now, turning to FIG. 4A, a system 100 is shown including a V8 engine block 102 and a one-piece housing apparatus 103 joined to the engine block along an interface 104. The housing 103 may be sealingly joined to the engine block as is known to those of skill in the art. Although the housing apparatus 103 is shown as one piece, the invention is not intended to be so limited. It is to be understood that the housing apparatus may vary widely except as where limited in the appended claims.

The engine block 102 shown in FIG. 4A includes a crankcase 192 with a rotating group consisting of a crankshaft 194 and connecting rods 196 with pistons 198 attached thereto. The cylinder heads are removed for clarity. The crankshaft 194 rotates in a clockwise direction (CW) as shown in this view.

This engine 100, when rotating at 6,500 rpm, can create a crankcase wind velocity of 165 mph at the outside diameter of the rotating group. This clockwise rotation forms a rotating 'cyclonic cloud' of lube oil and air within the crankcase 192 indicated by the arrows. Engines, depending on the stroke length and maximum rpm will produce crankcase cyclonic cloud velocities that commonly range from 100 to 250 mph.

Figure 4B:
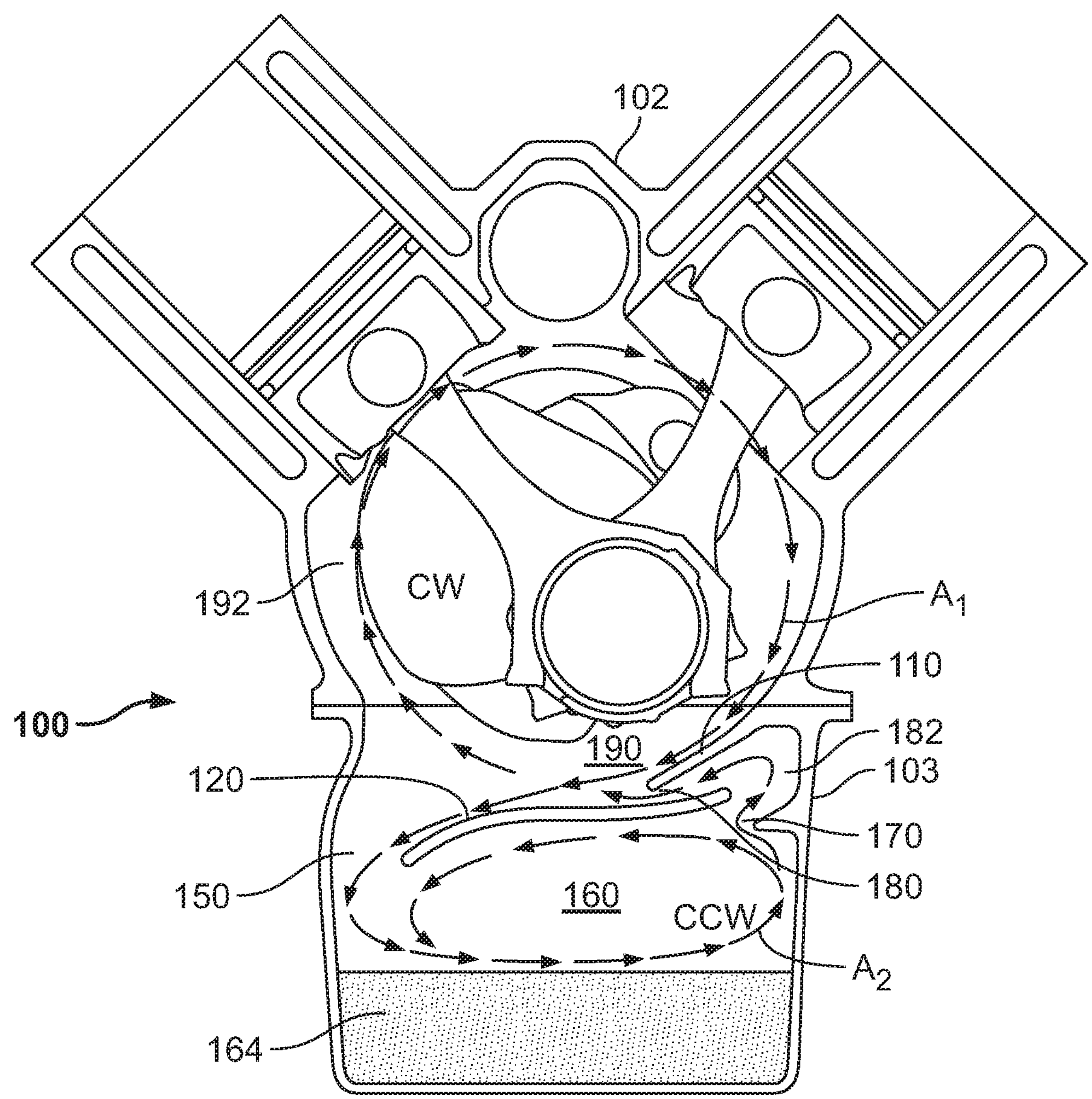
Figure 4C:
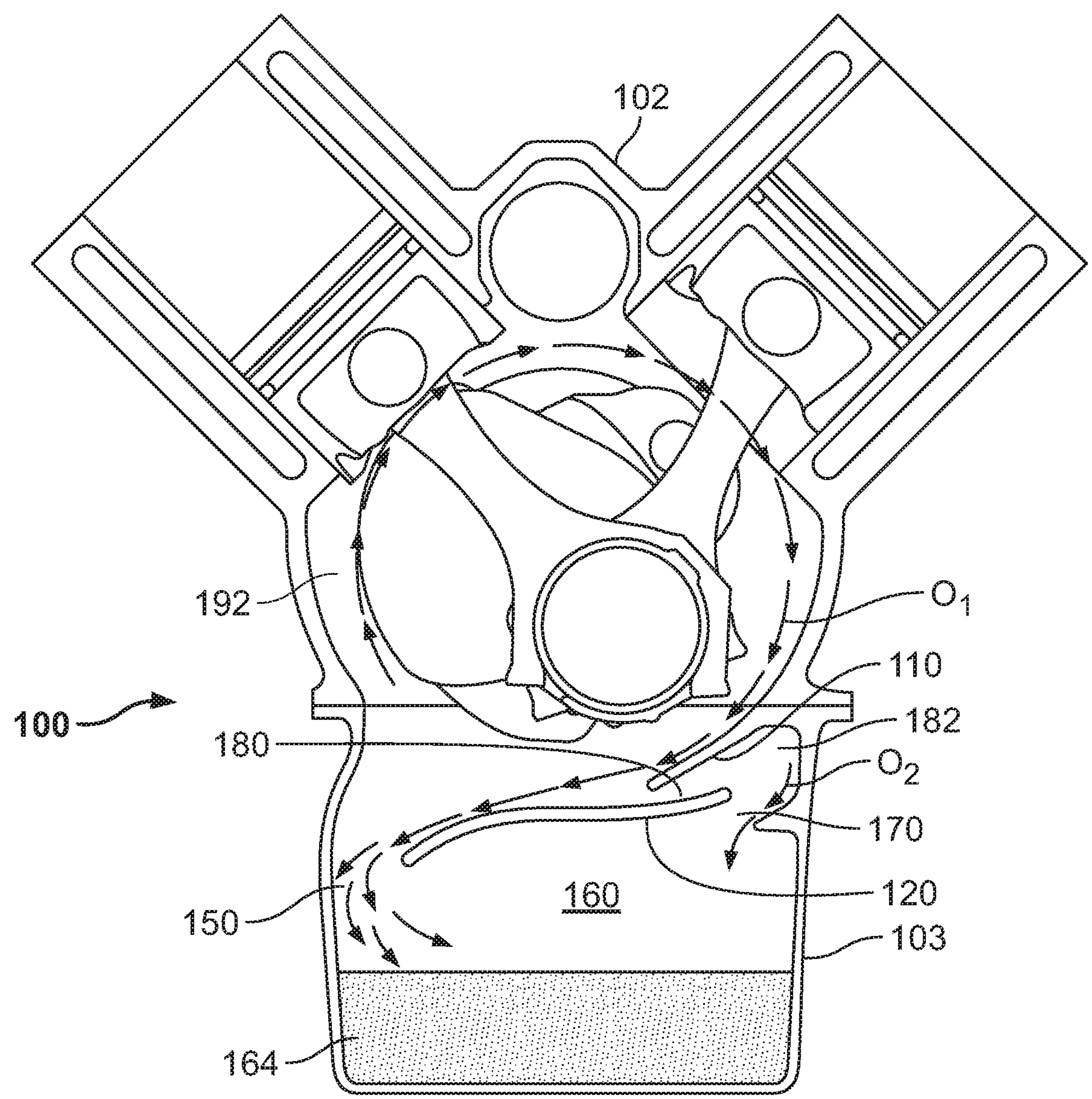

With reference to FIGS. 4B, 4C, in the crankcase 192, the centrifugal force of the rotating high speed cyclonic cloud forces the entrained oil outward wetting the accumulation plates 110, 120 in sequence, first the primary 110 and then the main 120. Accumulated oil is swept towards the trailing edge of each plate by the velocity of the rotating air mass and the air reentering the crankcase through the airflow control aperture 180. The crankcase airflow is virtually unimpeded and the separated lube oil flows smoothly into the oil air separation chamber 160 beneath. In a sense, the system is passive because the oil and air do not impact a scraper (or another obstacle to flow) along their flowpaths.

In the embodiment shown in FIGS. 4A-4C, the accumulation plates 110, 120 are curved. Particularly, a first curve is present on the primary plate 110 with the circumference of the crankcase air rotation, and then on the main plate 120 reversing the curvature away from the crankcase to favor flow into the separation chamber 160. The smooth curves serve to further reduce parasitic horsepower loss, oil aeration and oil temperature. Non-limiting exemplary dimensions for the various apertures are described herein.

FIG. 4B is an illustration of the airflow path for the system 100 shown in FIG. 4A. The air flow path ($A_1$, $A_2$) shown in FIG. 4B has a figure 8-shape with the interchange zone 190 as the crossing point. Unlike prior oil control scrapers or other impact devices, the lower leg A2 of the air flow path runs counter clockwise (CCW), which is opposite the clockwise (CW) rotation of the upper airflow leg A1 in the crankcase 192. The airflow control aperture 180 controls the air pressure in the primary separation chamber 160, as well as the airflow returning to the crankcase. The airflow control aperture 180 can be adjusted in cross section to achieve the desired performance. Additionally, a primary oil accumulation plate 110 acts as a flow diverter, forming a secondary separation chamber 182, and directs clean return air into the interchange zone 190, above the main oil accumulation plate 120 blending it into the air rotating in the crankcase. The angle of the primary oil accumulation plate 110 relative to the main plate 120 and the size of the airflow control aperture 180 can be adjusted, individually or collectively, to achieve optimum performance. Non-limiting exemplary dimensions for the various apertures are described herein.

FIG. 4C is an illustration of the oil flow path for the system 100 shown in FIG. 4A. The oil flow path ($O_1$) shown in FIG. 4C is gently directed by the primary oil accumulation plate 110 in the same direction defined by the circumference of the rotating crankcase air/oil mixture towards the main plate 120. The oil wets the main plate surface and is urged towards the separator entrance aperture 150 due to the high crankcase air velocity as well as gravity and the air flow path exiting the secondary separation chamber described above in connection with FIG. 4B. The oil reunites with the oil 164 in the pan basin/sump. Any oil droplets not immediately collected in the basin are captured in secondary separation chamber 182, and are directed according to arrow ($O_2$) to the oil basin. Unlike prior oil control scrapers or other impact devices, the path of the oil is impact free, and absent of barriers or obstacles. Instead, the arrangement of components and apertures gently and smoothly directs the oil from the crankcase into the oil basin. The airflow control aperture/nozzle(s) 180 can be adjusted in cross section to achieve the desired performance. Non-limiting exemplary dimensions for the various apertures are described herein.

Alternative Embodiments

Figure 4D:
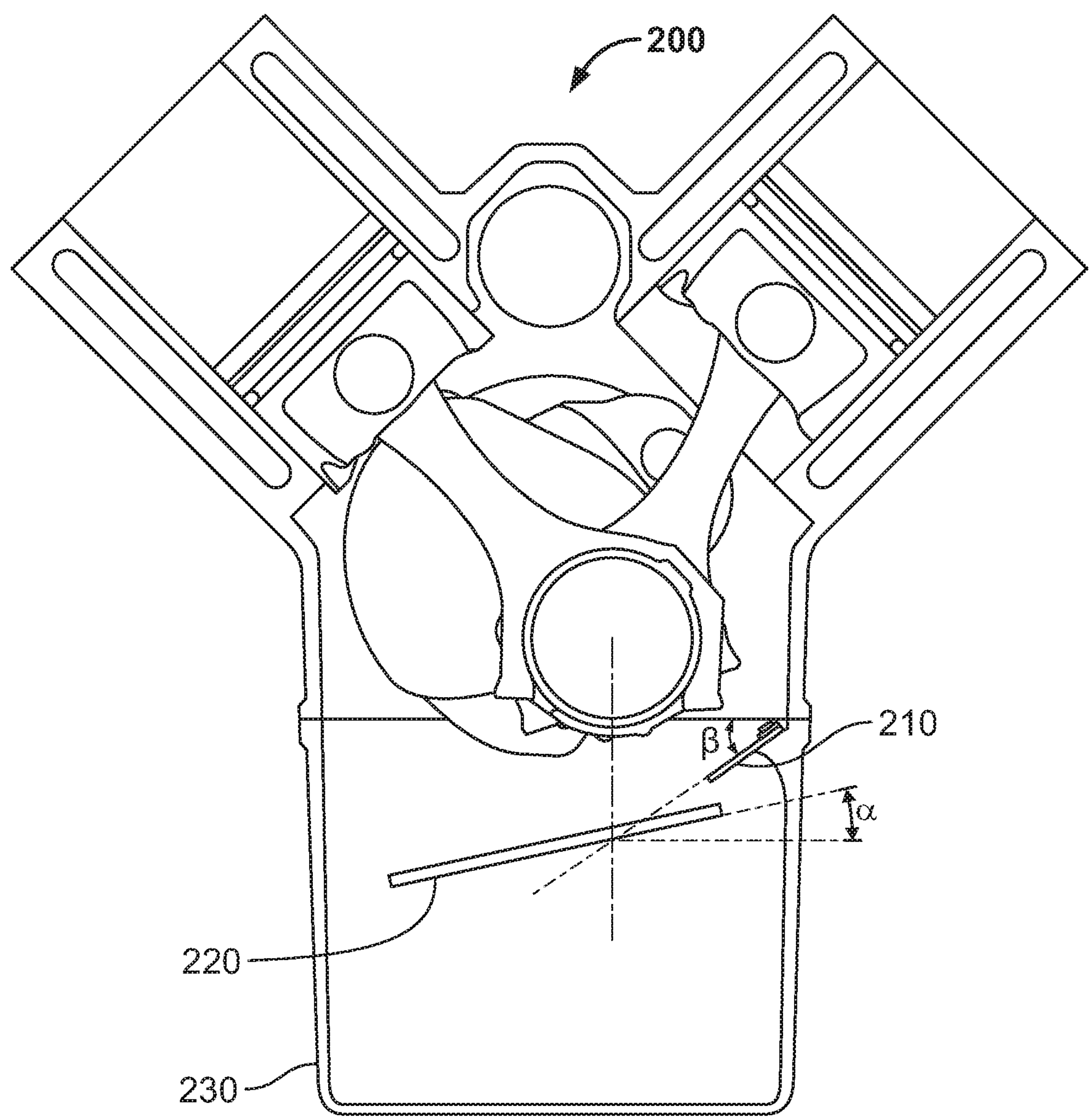

FIG. 4D shows an alternative embodiment of the invention similar to the embodiment described in FIGS. 4A-4C except the primary plate 210 and main plate 220 are flat. For example, each of the plates may be steel plates bolted or welded to the pan(s) 230 at angles beta and alpha from horizontal, respectively. In embodiments, angle alpha ranges from 0 to 30 degrees and angle beta ranges from 0 to 70 degrees. Although not as impact-free as the embodiment described in FIG. 4A, the flat plates are a low cost alternative to mitigate challenges arising from oil aeration, heating and aerodynamic drag.

Figure 4E:
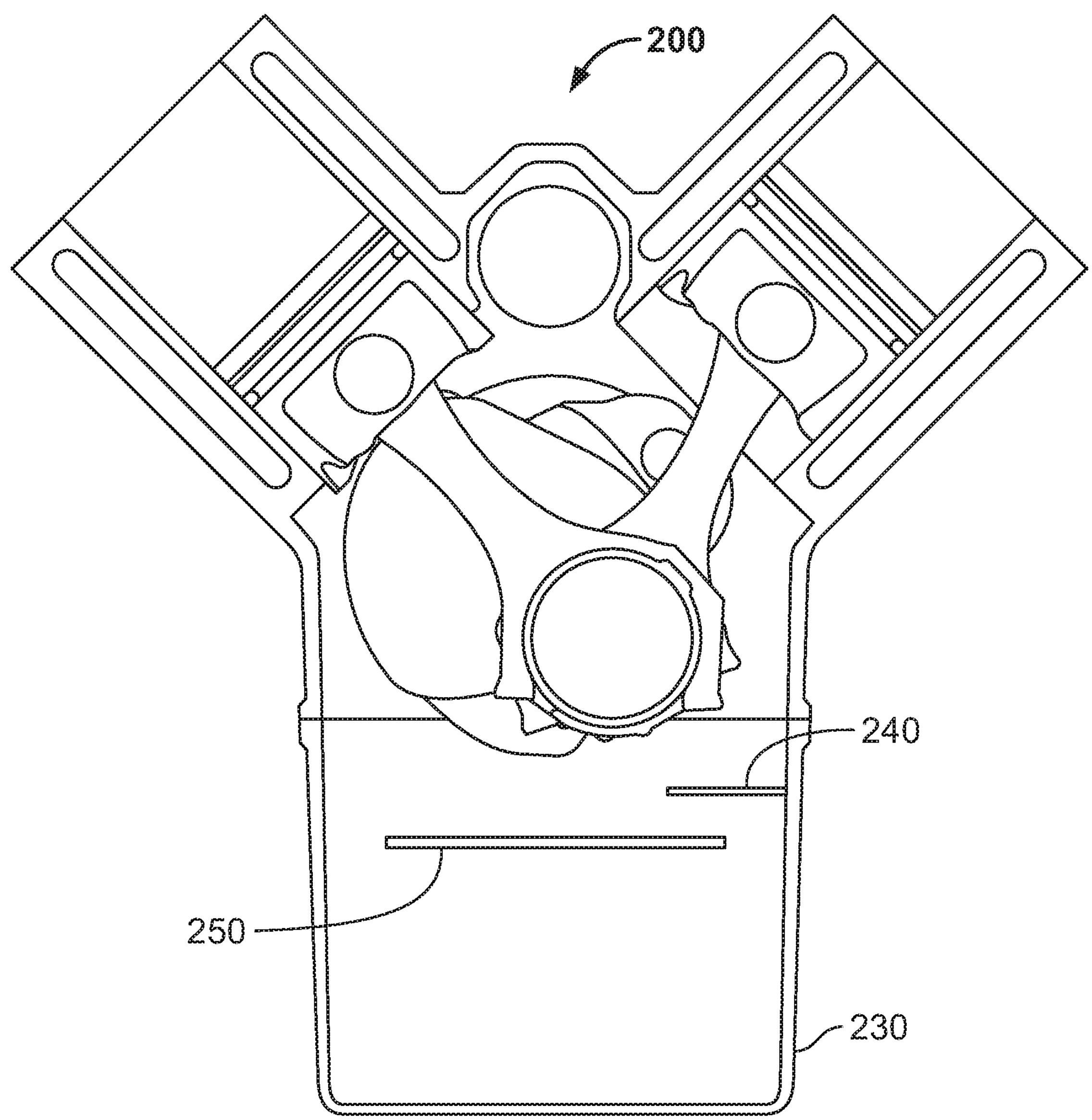

FIG. 4*e* is a cross section view of a system in accordance with another embodiment of the invention having straight accumulation plates 240, 250 except the plates are horizontal. Indeed, a wide range of types of plates, apertures sizes, and angles of the plates may be incorporated into the invention based on optimizing the efficiency of the engine, and reducing aeration and temperature of the oil.

FIGS. 5-11 illustrate another system 300 in accordance with the invention similar to the embodiments described above except the oil pan assembly is shown as two pieces including an upper pan 302, and lower pan 304. An integrated oil accumulation main plate 320 is located in the upper oil-pan or lower crank case area, and serves as a floor for the crankcase 324 thereby separating the cyclonic cloud of oil and air above from the oil 330 in the sump below, minimizing the disturbance and aeration of the oil in the sump. The main plate 320 slopes (e.g., ramps) downward dropping in elevation from right to left. Centrifugal force and air velocity drives oil and air across the main plate 320 and into the entrance aperture 350, decelerating and directing the oil-air flow beneath the main plate 320 and into the primary separation chamber 360, below.

The shape, cross section, and number of aperture/nozzle(s) that run the length of the crankshaft can be adjusted to suit the engine geometry and the desired aperture/nozzle flow velocity. In embodiments, the width of the downstream aperture is less than the upstream aperture. In embodiments, the area of the downstream aperture is less than the upstream aperture. Alternatively, in other embodiments, the size of the apertures may increase downstream or be equal. In particular embodiments, the width of the apertures range from 0.4 to 2 inches, and the areas from 5 to 20 sq. inches. In an exemplary embodiment, the width and area of the entrance, exit and airflow control apertures can be as set forth in FIG. 12.

The number of entrance, exit and airflow control apertures can vary. In embodiments, the number of entrance apertures ranges from 1-8, frequently 3-6, or optionally equals the number of crankshaft bays of the engine. In embodiments, the number of exit apertures ranges from 1-8, frequently 3-6, or optionally equals the number of crankshaft bays of the engine. In embodiments, the number of airflow control apertures ranges from 1-8, frequently 3-6, or optionally equals the number of crankshaft bays of the engine.

The shape of the apertures may also vary. In embodiments, the shape of the aperture is rectangular or slot-like. The shape may also be round or obround.

As mentioned herein, unlike prior oil control scrapers or other impact devices, the air flow path above the lube oil runs counter clockwise which is opposite the clockwise rotation in the crankcase. The airflow control aperture 380 controls the air pressure in the primary separation chamber 360, as well as the airflow returning to the crankcase 324. The airflow control aperture 380 can be adjusted in cross section to achieve the desired performance. A primary plate 372, forms a secondary separation chamber 382, and diverts the flow of clean air into the interchange zone 390, above the main plate 320 blending it into the air rotating in the crankcase. The angle of the primary plate relative to the main plate and the size of the airflow control aperture 380 can be adjusted, individually or collectively, to achieve optimum performance.

FIGS. 6-11 show various views of the upper and lower pans 302, 304 shown in FIG. 5. As can be seen in FIGS. 6-11, the shape of the apertures has a rectangular or slot-like appearance. However, it is to be understand that the shape of the apertures may vary widely and be obround or another shape. The invention is intended to be limited only as recited in the appended claims.

Examples

With reference to FIG. 12, test results of an embodiment of the subject invention is indicated for various aperture dimensions versus material flowed. The engine included an entrance aperture 150, exit aperture 170, and airflow control aperture 180 as illustrated in FIG. 4A, and corresponding dimensions set forth in the table of FIG. 12.

The engine was run and the measured oil flow was 18 gpm nominal.

As expected, oil and air flowed through the entrance apertures. Oil mist and air flowed through the exit apertures. But, favorably, only air flowed through the airflow control aperture 180. As the flow progresses downstream, the smaller width and area of each aperture facilitated air flow therethrough while permitting/encouraging the oil and oil mist to fall out of the airflow path. Desirably, only air returned to the crankcase air interchange zone from the oil basin.

With reference to FIG. 13, test results (Banks Test 1 and Banks Test 2) of an embodiment of the subject invention versus a stock GM oil pan assembly is indicated. The stock 2017 GM oil pan assembly featured scraper/impact surfaces and a partial windage tray with perforations. The engine was warmed until the temperatures stabilized, followed by 10 minutes at full power.

All parameters (namely, engine and test rig, oil cooling system, fuel rate and timing, oil and coolant flows, oil filter, boost pressure, air/fuel ratio, engine rpm) were the same as between the stock oil pan and windage system and the Banks Test 1, 2 lube oil aeration and thermal control system. According to the data, the subject invention results in substantially decreased lube oil aeration (by 60+%), more oil in the pan, and less resident oil in the engine crankcase (by 40%) vs the stock GM oil pan assembly. Additionally, when the oil temperature was measured for the same oil cooler coolant temperature, the oil temperature was 6 degrees (2+%) less than the stock engine. Finally, the power output of the Banks Test 1, 2, lube oil aeration and thermal control system increased 1.2% over the stock GM oil pan assembly while consuming the same fuel amount. This data shows the clear improvement over a stock oil pan and windage design such as that tested in FIG. 13.

Many modifications and variations of the present invention are possible in light of the above teachings. It is therefore to be understood that within the scope of the appended claims the invention may be practiced otherwise than as specifically described. Features and components may be made from multiple pieces or formed as single piece units. For example, although the oil pan shown in FIG. 5 is a two piece assembly for manufacturing convenience, it could be one piece.

The invention claimed is:

1. A system for collecting lube oil in an internal combustion engine with a rotating crankshaft assembly, the system comprising:

a primary separation chamber arranged above an oil sump;

an air interchange zone arranged above the primary separation chamber;

an entrance aperture fluidly coupling the air interchange zone to the primary separation chamber;

an exit aperture laterally spaced from the entrance aperture and fluidly coupling the primary separation chamber to the air interchange zone and for guiding air arising from the motion of the rotating crankshaft assembly from the primary separation chamber to the air interchange zone;

a main oil accumulation plate extending from the entrance aperture to the exit aperture and separating the primary separation chamber and the air interchange zone; and a primary oil accumulation plate, the primary oil accumulation plate located above the exit aperture, extending towards the main oil accumulation plate at a first angle, and defining an airflow control aperture between the main oil accumulation plate and the primary oil accumulation plate through which fluids from the exit aperture are directed.

2. The system of claim 1, wherein the first angle ranges from 0 to 50 degrees.

3. The system of claim 2, wherein the airflow control aperture has a width, and said width ranges from 0.1 to 1.0 inches.

4. The system of claim 3, wherein the main oil accumulation plate slopes downward from the exit aperture to the entrance aperture at a second angle.

5. The system of claim 4, wherein of the second angle ranges from 0 to 30 degrees.

6. The system of claim 1, wherein the main oil accumulation plate is spaced from the axis of the crankshaft assembly by a crankshaft gap, and wherein the crankshaft gap ranges from 0.5 to 2.5 inches.

7. The system of claim 1, wherein the primary oil accumulation plate comprises a first curvature defined by the circumference of the rotating crankcase oil/air mixture.

8. The system of claim 7, wherein the main oil accumulation plate comprises a trailing portion having a second curvature, wherein the second curvature is away from the crankshaft.

9. The system of claim 1, wherein an area of the entrance aperture is greater than or equal to an area of the exit aperture.

10. The system of claim 1, wherein the area exit aperture is greater than or equal to an area of the airflow control aperture.

11. The system of claim 1, comprising a plurality of longitudinally-spaced apart entrance apertures.

12. The system of claim 1, comprising a plurality of longitudinally-spaced apart exit apertures.

13. The system of claim 1, wherein the separation chamber and the air interchange zone are separate regions of one integrally formed housing.

14. A system for collecting lube oil in an internal combustion engine with a rotating crankshaft assembly, the rotating crankshaft assembly generating a first circular flowstream about the crankshaft, the system comprising:

a primary separation chamber arranged above an oil sump;

an air interface zone arranged above the primary separation chamber, and separated from the primary separation chamber by a main oil accumulation plate;

an entrance aperture fluidly coupling the primary separation chamber to the air interchange zone and for guiding oil and air from the air interface zone to the primary separation chamber;

an exit aperture laterally spaced apart from the entrance aperture and fluidly coupling the primary separation chamber and the air interface zone and for returning air to the air interface zone from the primary separation chamber; and wherein the a second circular flowstream is generated about the main accumulation plate in an opposite direction to the first circular flowstream wherein the first circular flowstream mixes with the second circular flowstream within the air interface zone, thereby separating the oil from the air in the primary separation chamber and reducing aeration and heating of the oil.

15. The system of claim 14, further comprising a primary oil accumulation plate, the primary oil accumulation plate located above the exit aperture aiming fluids from the exit aperture towards the interchange zone.

16. The system of claim 14, wherein the first circular flowstream and the second circular flowstream collectively form a figure 8-type shape.

17. The system of claim 14, wherein the ratio of pan oil to crankcase oil is at least 7/3.

18. The system of claim 14, wherein the aeration of lube oil is less than 5%.

19. An internal combustion engine having reduced lube oil aeration, the engine comprising:

an engine block including a rotating crankshaft assembly and a plurality of oil passages;

a crank case arranged below the engine block;

an air interchange zone arranged below the crank case;

a primary separation chamber arranged below the air interchange zone;

an oil sump for collecting and storing oil arranged below the primary separation chamber;

wherein the air interchange zone and the primary separation chamber are separated by a main oil accumulation plate; and wherein fluids from the crank case are transported to the primary separation chamber through an entrance aperture; and wherein fluids from the primary separation chamber are transported to the crank case through an exit aperture laterally spaced from the entrance aperture; and a primary oil accumulation plate located above the exit aperture, extending towards the main oil accumulation plate at a first angle, and defining a secondary oil separation chamber and an airflow control aperture between the main oil accumulation plate and the primary oil accumulation plate through which fluids from the exit aperture are directed wherein the airflow control aperture regulates the velocity of the air exiting the secondary separation chamber and entering the air interchange zone, and the pressure in both the primary separation chamber and the secondary separation chamber.

20. The engine of claim 19, further comprising a pump for driving the oil from the oil sump through the plurality of oil passages.

21. The engine of claim 19, further comprising an oil filter arranged along the flowpath of the oil, downstream of the oil pump, and prior to the engine block.

22. The engine of claim 19, further comprising an oil cooler arranged along the flowpath of the oil, downstream of the oil pump, and prior to the engine block.

* * * * *

UNITED STATES PATENT AND TRADEMARK OFFICE

CERTIFICATE OF CORRECTION

PATENT NO. : 10,934,904 B2
APPLICATION NO. : 16/920644
DATED : March 2, 2021
INVENTOR(S) : Gale C. Banks, III It is certified that error appears in the above-identified patent and that said Letters Patent is hereby corrected as shown below:

In the Claims

Column 8, Line 29, after the word -wherein-, delete “the”.

Column 9, Line 14, replace “claim 19” with -claim 20-.

Column 9, Line 15, replace “the flowpath” with -a flowpath-.

Column 9, Line 17, replace “claim 19” with -claim 21-.

Signed and Sealed this
Third Day of June, 2025

Coke Morgan Stewart
*Acting Director of the United States Patent and Trademark Office*